Figure 1:
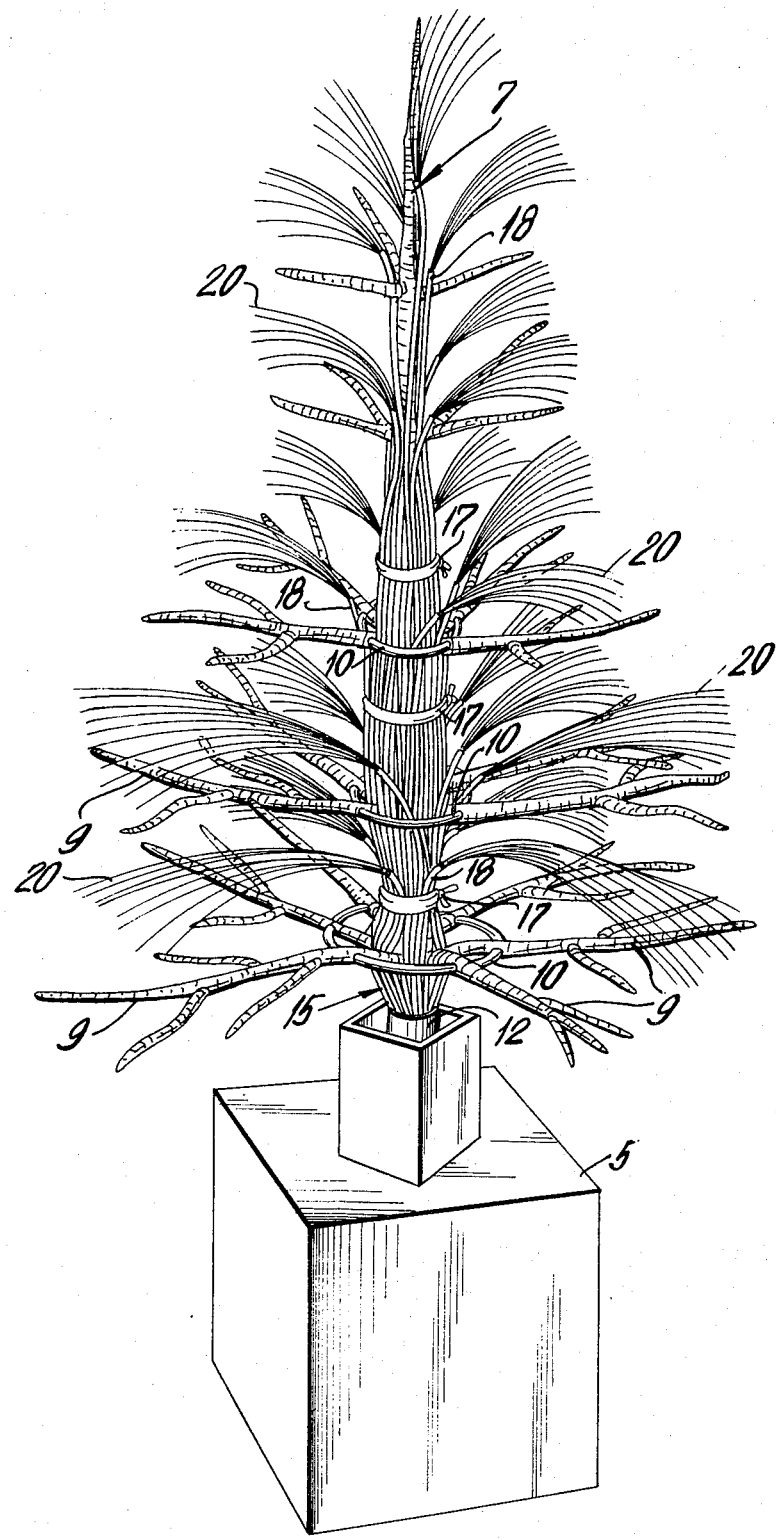

United States Patent
Sadacca et al.

[11] 3,766,376
[45] Oct. 16, 1973

[54] ARTIFICIAL CHRISTMAS TREE ILLUMINATED BY OPTIC FIBER SPRAYS

[75] Inventors: Albert V. Sadacca, Wilmette; Bernard Paulfus, Palos Hills, both of Ill.

[73] Assignee: Noma-World Wide, Inc., Chicago, Ill.

[22] Filed: Mar. 2, 1972

[21] Appl. No.: 231,143

[52] U.S. Cl............. 240/10 L, 240/10 Q, 240/10.1
[51] Int. Cl..... F21p 1/02, A47g 33/06, A47g 33/16
[58] Field of Search............. 240/10 T, 10 R, 10 P, 240/52 R, 10.1, 10 Q, 10 L

[56] References Cited
UNITED STATES PATENTS

| | | | |
|---|---|---|---|
| 3,641,335 | 2/1972 | Wall | 240/10 T |
| 3,564,233 | 2/1971 | Cox | 240/10 T |
| 3,465,139 | 9/1969 | Siegal | 240/10 T |
| 3,614,528 | 10/1971 | Craddock | 240/10 T UX |
| 2,227,861 | 1/1941 | Petrone | 240/10 T |

Primary Examiner—Joseph F. Peters
Attorney—Marvin B. Rosenberg

[57] ABSTRACT

A Christmas tree illuminated by a multiplicity of optic fiber sprays is provided in which an illuminator or light source is positioned in the base of the Christmas tree and bundled separately encapsulated fiber optic conduits extend upwardly from the base along the tree trunk. These fiber optic conduits branch out from the bundle along the tree trunk to extend laterally along the branches of the tree. The conduits terminate in a spray of optical fibers to provide a radiant multiplicity of pin point-like ornamental lights over the entire tree.

5 Claims, 4 Drawing Figures

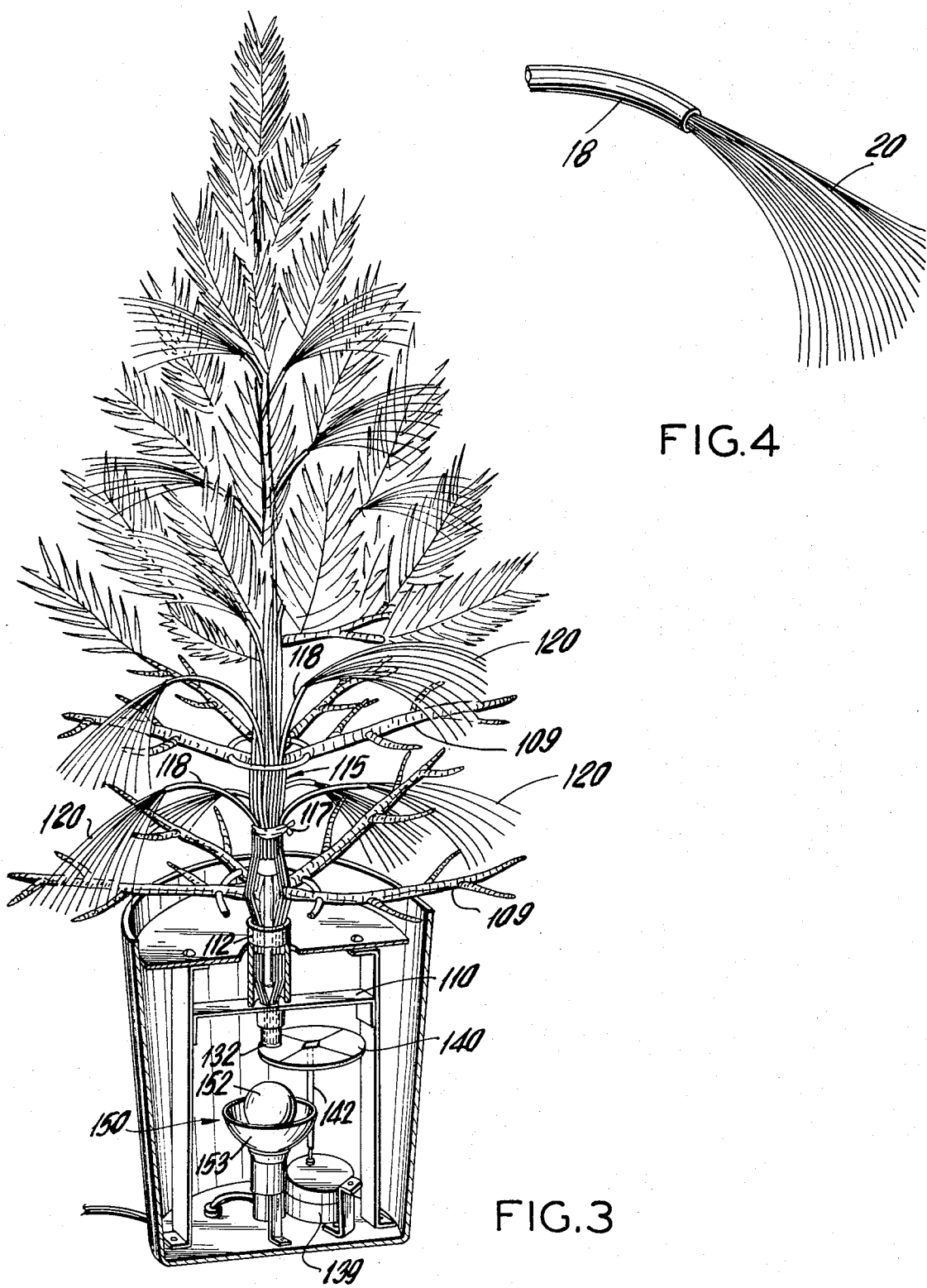

ARTIFICIAL CHRISTMAS TREE ILLUMINATED BY OPTIC FIBER SPRAYS

BACKGROUND OF THE INVENTION

Recently, ornamental or display lighting and lamps employing optic fibers have become quite popular. Such ornamental lamps generally employ a bundled group of optic fibers held closely grouped together at one end, and unrestrained at the other end so as to spread apart in a spray or cascade of fibers. When a source of illumination, such as a high intensity light, is placed at the grouped end of fibers, the light, due to the light conducting properties of the fibers, travels through each fiber substantially without dispersing and emerges, at the opposite end, to produce a multiplicity of pin point-like lights which give a quite pleasing appearance. Devices of this type are shown in U.S. Pat. No. 3,431,410 to Dolan et al, and U.S. Pat. No. 3,532,874 to Rosenast.

Of course, one very popular type of illuminated ornamental display is a Christmas tree, and efforts have been made to provide an artificially illuminated Christmas tree by employing light pipes and other types of light conductors including optic fibers. Light pipes for illuminating an artificial Christmas tree are disclosed in U.S. Pat. No. 1,921,614 to Fry Jr., U.S. Pat. No. 2,227,861 to Petrone and U.S. Pat. No. 3,465,139 to Siegal. All of these devices show elongated glass or lucite rods which extend through the trunk of the Christmas tree to conduct light to or through the branches thereof. Although the wiring of such trees is greatly simplified by the construction shown in the patents mentioned, these trees have little advantage in appearance over the conventional Christmas tree illumination system since they merely provide bulb-like Christmas lights for the tree.

U.S. Pat. No. 3,564,233 to Cox et al, shows a Christmas tree illumination system employing separately encapsulated optical fiber conduits which are branched off from a central optical fiber bundle which is positioned along the trunk of the tree. These fiber conduits, which extend along the branches, have mounted on the terminal ends thereof, translucent shapes, such as round balls, or Santa Claus heads or the like. The light which is transmitted through the central bundle of fibers illuminates these shapes.

Systems, such as described above do not take advantage of the decorative illuminating effect provided by optic fibers, inasmuch as they do not provide a spray of optic fibers, nor a multiplicity of pin point-like lights. One attempt has been made to provide such an effect on a Christmas tree. In U.S. Pat. No. 3,624,385 a fiber optic spray adapter for a Christmas light bulb is shown. This adapter is formed to fit over a standard Christmas light, and has a plastic spray of optic fibers mounted in a cylindrical fitting which fits about the light bulb. The theory of this device is that the Christmas light bulb will provide the light source rather than act as the display itself, and illuminate the optic fibers. Although, this device seeks to take advantage of the spray-like effect which can be provided by optic fibers, it has several drawbacks. Firstly, the disadvantages of conventional Christmas lights are retained in that electrical connections all over the tree are still needed, and each Christmas bulb must be in operating condition for the spray to be illuminated. Furthermore, each Christmass light, since it is of relatively low wattage, provides only a minimum amount of light, much of which is lost in the passage of the light through the optic fibers. Thus, the effect produced of a multiplicity of pin point-like spray of lights is minimal.

STATEMENT OF THE INVENTION

This invention provides an artificial Christmas tree employing a fiber optic illumination system which takes advantage of the lighting effect of a pin point-like spray of lights. Moreover, the system is simple, inexpensive, and provides a pleasing, overall appearance for the Christmas tree.

The optic fiber illuminated, articifial Christmas tree of the invention comprises a base; an artificial Christmas tree supported thereon; said tree having a trunk which extends upwardly from within the base, and a plurality of branches; a bundled group of separately encapsulated fiber optic conduits, said bundle of conduits having a closely grouped end positioned within the base, and said bundle extending from within the base upwardly along the tree trunk, said conduits branching separately along the branches of the tree and each of said conduits having a multiplicity of fibers therein, and said fibers emerging from the encapsulation of each conduit in an unrestrained manner so as to form a loose, randomly arranged spray of fibers; and a light source positioned within the base adjacent the closely grouped end of the conduits so as to project light thereon and illuminate the sprays of fibers on the tree.

GENERAL DESCRIPTION OF THE INVENTION AND SPECIFICATION

The Christmas tree of this invention is an artificial tree, preferably formed of polypropylene having a central trunk from which emerge branches having imitation or molded plastic foliage thereon. Any artificial tree construction which is self supporting could be employed, and such artificial trees are well known to those skilled in the art.

A bundle or group of separately encapsulated optic fiber conduits extend upwardly from the base of the tree and are positioned about the tree trunk. These optic fiber conduits are encapsulated in a tubular sheath of plastic material. The fibers themselves are preferably glass fibers, although plastic fibers such as polystyrene plastic fibers having an acrylic cladding can be used if desired. Each fiber conduit extends along the tree trunk to a point at which it is split away from the main trunk of the tree, and the remainder of the bundles of optic fiber conduits. The position at which the conduits are split away from the group corresponds to the positions at which the branches of the tree emerge from the trunk. The bundle of conduits can be held to the trunk of the tree by straps, or ties, and the conduits which are split away from the group can merely fall along the branches and lie on the branches for support. If desired, the branching conduits can also be tied or otherwise affixed to the branches. The plastic sheath of each conduit is stripped away at the end of each conduit exposing an unrestricted length of optic fiber for a length of within the range of from approximately 2 to about 12 inches for glass fiber of 0.0025 inch thickness, permitting the fibers to spew forth or emerge from the sheath in a spray-like effect. The fibers are free to form a random configuration which defines, when illuminated, a multiplicity of pin point-like lights, each separated from the next to as to form light sprays which illuminate the entire tree. No special mechanism for terminating the ends of the fibers such as a collar or other similar device for bunching or spreading the fibers at the ends thereof or as they emerge from the fibers is required. All that is necessary is that the sheath be stripped away from the fibers and the fibers allowed to fall unrestrained and spread from the sheath under their own weight and tensile strength. If the lengths such as specified above are used, a spray-like affect will be produced.

The bottom of the tree can be mounted in a fitting which also houses the encapsulated optic fiber conduits and which forms a termination for the fiber ends permitting them to be exposed to the light source for illumination. The light source is mounted within the base of the tree and can comprise a high-intensity bulb positioned adjacent the fiber ends.

It is also possible to provide a color wheel interpositioned between the light source and the optic fiber termination. This color wheel can be rotated by an electric motor, or a heat motor, or by any other means, so as to provide a changing color pattern on the optic fiber sprays. It is also possible to combine a drive mechanism with the color wheel mechanism and simultaneously rotate the tree as well as the color wheel to further provide a decorative affect.

The invention can best be understood by reference to the drawings. FIG. 1 shows an artificial Christmas tree in accordance with this invention. The Christmas tree has a base 5 from which the trunk 7 of the tree emerges. At various locations along the tree trunk a plurality of branches 9 are formed. These branches are illustrated without foliage for the sake of clarity. The branches radiate in a series of branches from the trunk at several different heights along the tree length. At each height, the radiating branches are linked together by an integrally formed annular collar 10 which holds them upright as they extend outwardly from the tree trunk. The base of the base of the trunk, is mounted in a bushing 12 which extends into the base 5. Also mounted within the bushing 12 and positioned about the tree trunk 7 is a bundle of separately encapsulated optic fiber conduits 15. This bundle is tied to the tree trunk by ties 17 positioned at various locations along the tree trunk and is threaded through the collars 10 to support the fibers along the tree trunk. Each conduit 15 is encapsulated in a polyproplyene plastic sheath 18 which encloses the group of glass optic fibers which are 0.0025 inches thick. These fibers emerge from the sheath for a length of approximately six inches and form a spray of fibers 20 in which the fibers stand apart from each other and spread out to form a multiplicity of light points on the branches of the tree. The spray can best be seen by reference to FIG. 4. It is to be noted that the spray is formed merely by the emerging optic fibers as they spew forth from the sheath 18. The fibers need not be spread apart since the combination of their own weight, tensile strengh and resilience tends to spread them apart since they are unrestrained from the point at which they emerge from the sheath.

The optic fiber conduits 15 are formed to a length corresponding to the position at which the conduits emerge from the central bundle of conduits. Each conduit is split away form the bundle and extends along the tree branches and is supported by the branches and foliage thereon.

Figure 2:
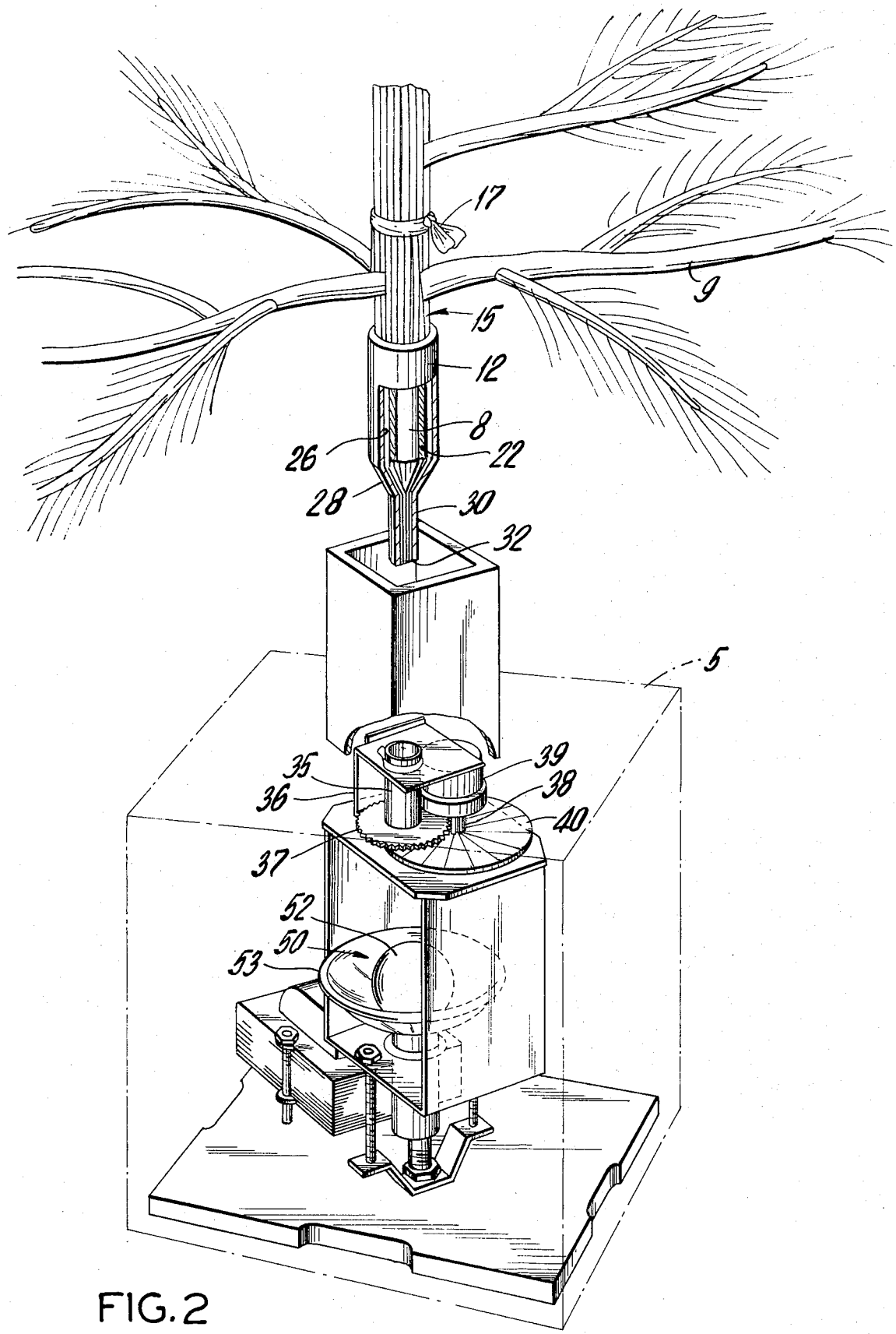

The opposite ends of the optic fiber conduits 15 extend to within the base and are captured in the bushing 12 as does the end 8 of the tree trunk 7 as best seen by reference to FIG. 2. The tree trunk 8 is supported in the bushing 12 by a tubular support 22 mounted within the bushing 12. The support 22 firmly holds the tree trunk in an erect position. An annular channel 26 is defined between the intereir wall of the bushing 12 and the exterior wall of the tubular support 22 for the tree trunk. The fiber conduits 15 are threaded through this annular channel and then are passed through a convering necked-down portion 28 in the bushing 12. The fibers are then grouped tightly together within a narrow tubular portion 30 in the bushing 12. The end of this portion 30 constitutes the termination for the optic fibers. All the fibers terminate on a flat planar surface 32 so as to form a uniform end for receiving light from the light source as will be described hereinafter.

The end 30 of the bushing 12 fits within a drive sleeve 35 rotatably mounted on a support 36 formed within the base. This sleeve receives the cylindrical portion 30 of the bushing 12 in a tight fit such that the bushing 12 and the tree trunk held therewithin, as well as the entire optic fiber bundle of conduits, are mounted for rotation along with the sleeve 35. The bottom of the sleeve 35 has a drive gear 37 fixed thereto. This drive gear engages a gear 38 mounted to the drive shaft of the motor 39 which is also positioned within the base and mounted on the support 36. The motor 39 via the gear 38 causes the drive gear 37 on the sleeve 35 to rotate thereby rotating the sleeve and the tree and the optic fiber bundle therewith. The motor 39 also is attached via the drive shaft to a color wheel 40. The color wheel 40 is mounted parallel to but beneath the drive sleeve 35 and is interposed between the end surface 32 of the optic fiber termination and the light source 50. The light source 50 comprises a high intensity bulb 52 connected via a transformer to a source of electricity. The light bulb 52 is provided with a reflector 53 which concentrates the light emanating from the bulb on the end surface 32 of the fiber. The light emanating from the bulb and the reflector 53 passes through the color wheel 40 prior to entering the fibers then passes therethrough to emerge at the sprays.

Operation of the device describes is as follows: upon connection into an electric circuit, the motor 39 rotates the color wheel 40 and at the same time, rotates, the sleeve 35 via the gear 38 and drive gear 37. This rotates the tree along with the optic fiber bundle attached thereto. As the tree and the color wheel rotate, the bulb 52 projects light through the end surface 32 of the optic fiber conduits, this light which constantly changes color then passes through the conduits to the sprays and emerges in a changing color pattern of pin point-like lights which, accompanied by rotation of the tree, provides an unusually interesting and decorative lighting effect for the tree.

In FIG. 3, another embodiment of the tree of the invention is shown. In this embodiment, a somewhat simplified construction is employed making it less expensive to build. Once again, the bottom of a tree trunk 107 of a similar artificial tree is mounted within a bushing 112. Also, as in the embodiment of FIGS. 1 and 2, a bundle of separately encapsulated optic fiber conduits 115 emerges from the bushing 112 and surrounds the tree trunk 107. These conduits are held in place by ties 117 positioned at various locations along the tree trunk. The conduits 115 are split off from the central bundle at different locations along the tree and are formed into sprays 120 of plastic fibers 0.020 inch thick which spew forth from the plastic sheath 118 for a length of 10 inches. The sprays and conduits are supported by the branches 109 of the tree.

In this embodiment, as contrasted to that shown in FIGS. 1 and 2, the bushing 112 is mounted in a fixed position by a support 110 in the base. The termination surface 132 of the fibers, which is of similar construction to that described above, is positioned adjacent the color wheel 140. However, the color wheel 140 is rotated by a motor 139 via a direct drive shaft 142. Ther is no gear connection between the color wheel and the motor, nor is there any gear drive mechanism for rotating the tree; thus, the motor can be much smaller since it need not rotate the entire tree and no gears are required. A light source 150 is provided having a bulb 152 and a reflector 153.

In operation, when the tree is connected into an electric circuit, the motor 139 rotates the color wheel 140 and the light source 150 projects light through the color wheel onto the end surface 132 of the optic fibers. This light then travels through the optic fiber conduits and emerges from the optic fibers in a multiplicity of pin point-like lights over the entire tree.

Having regard to the foregoing disclosure, the following is claimed as the inventive and patentable embodiments thereof:

1. An artificial Christmas tree illuminated by optic fiber sprays, comprising, a hollow base for the tree; a plastic artificial Christmas tree mounted on the base, said tree having a central trunk extending upwardly from the base and a plurality of branches extending laterally from the trunk, said branches having imitiation foliage thereon; an assemblage of flexible optic fiber conduits, each said conduit comprising a multiplicity of generally axially aligned flexible optic fibers and means retaining the multiplicity of fibers together as a separate and discrete bundle, said conduits being in part disposed axially relative the trunk of the tree and being fixed in positions about the tree trunk at several locations, such that the assemblage substantially encloses the tree trunk adjacent the base and said assemblage of conduits extends into the base; said conduits extending laterally from said assemblage above the base at locations generally corresponding to the location of branches on the tree, each end of each such conduit having the fibers therein extending in an restrained manner beyond said retaining means, and said flexible fibers projecting in random configurations under their own weight and tensile strength to define sprays of separate optic fibers interspersed among the branches and foliage of the tree; a support engaging said assemblage of conduits extending into the base and closely gathering the conduits in a fixed position therewithin to define a generally planar fiber optic termination surface, said tree trunk being enclosed within the group of conduits also being held in position by said same support such that said tree and said conduits are held together as a unit; a light source positioned in the base adjacent the termination and directed to project light onto the termination surface; a color wheel within the base positioned between the light source and the termination surface; and means for rotating the color wheel such that the sprays of fibers produce the effect of a multicolored and changing multiplicity of pinpoint-like lights which emerge from within the foliage of the tree.

2. An artificial Christmas tree illuminated by optic fiber sprays in accordance with claim 1, including a motor and drive mechanism adapted to rotate as a unit both the tree and fiber conduit assemblage as well as the color wheel.

3. An artificial Christmas tree illuminated by optic fiber sprays in accordance with claim 1, in which the fibers extend beyond said retaining means for a length in excess of two inches.

4. An artificial Christmas tree illuminated by optic fiber sprays in accordance with claim 1, in which the fibers are glass fibers.

5. An artificial Christmas tree illuminated by optic fiber sprays in accordance with claim 1, in which the fibers are plastic fibers.

* * * * *